United States Patent [19]

Russ et al.

[11] Patent Number: 5,781,535
[45] Date of Patent: *Jul. 14, 1998

[54] IMPLEMENTATION PROTOCOL FOR SHN-BASED ALGORITHM RESTORATION PLATFORM

[75] Inventors: Will L. Russ; Sridhar Alagar, both of Dallas; Sig Harold Badt, Jr., Richardson; Lee D. Bengston, Murphy; Tim T. Chao, Plano; Fred Ellefson, Allen; Bryan J. McGlade; Mark W. Sees, both of Plano; Clint Allen Wagner, Allen, all of Tex.

[73] Assignee: MCI Communications Corp., Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 665,177

[22] Filed: Jun. 14, 1996

[51] Int. Cl.[6] .................................................. H04J 1/16
[52] U.S. Cl. .................... 370/248; 370/252; 340/827
[58] Field of Search ................... 370/16, 16.1, 54, 370/94.3, 94.1, 242, 244, 247, 248, 252, 255; 379/221; 340/827, 825.01; 371/11.2

[56] References Cited

U.S. PATENT DOCUMENTS

| | | | |
|---|---|---|---|
| 4,393,493 | 7/1983 | Edwards | 370/16 |
| 4,956,835 | 9/1990 | Grover | 370/16 |
| 5,068,892 | 11/1991 | Livanos | 379/221 |
| 5,168,495 | 12/1992 | Smith | 370/85.6 |
| 5,235,599 | 8/1993 | Nishimura et al. | 371/11.2 |
| 5,311,586 | 5/1994 | Bogart et al. | 379/221 |
| 5,459,716 | 10/1995 | Fahim et al. | 370/16 |
| 5,461,608 | 10/1995 | Yoshiyama | 370/16.1 |
| 5,469,439 | 11/1995 | Thaler et al. | 370/94.3 |
| 5,479,608 | 12/1995 | Richardson | 395/182.2 |
| 5,495,471 | 2/1996 | Chow et al. | 370/16 |
| 5,513,345 | 4/1996 | Sato et al. | 395/182.02 |
| 5,519,709 | 5/1996 | Albrecht et al. | 370/94.3 |
| 5,537,532 | 7/1996 | Chng et al. | 395/182.02 |
| 5,548,639 | 8/1996 | Ogura et al. | 379/221 |
| 5,550,805 | 8/1996 | Takatori et al. | 370/16.1 |
| 5,581,791 | 12/1996 | Ludwig et al. | 395/860 |

OTHER PUBLICATIONS

Grover, Wayne, Ph.D., "Distributed Restoration of the Transport Network," *Network Management into the 21st Century*, Chapter 11, IEEE Press, 1994, pp. 337–417.
Grover, W., "A Fast Distributed Restoration Technique for Networks Using Digital Crossconnect Machines," *IEEE*, 1987, pp. 28.2.1–28.2.6.

*Primary Examiner*—Hassan Kizou
*Assistant Examiner*—A. Bnimoussa

[57] ABSTRACT

A system and method for restoring communication between at least one pair of nodes in a network. Distributed intelligence is provided by messaging between adjacent nodes in the network. The messages in combination with user-configurable timers and rules provide fault isolation, forward flooding, reverse linking and connection.

19 Claims, 12 Drawing Sheets

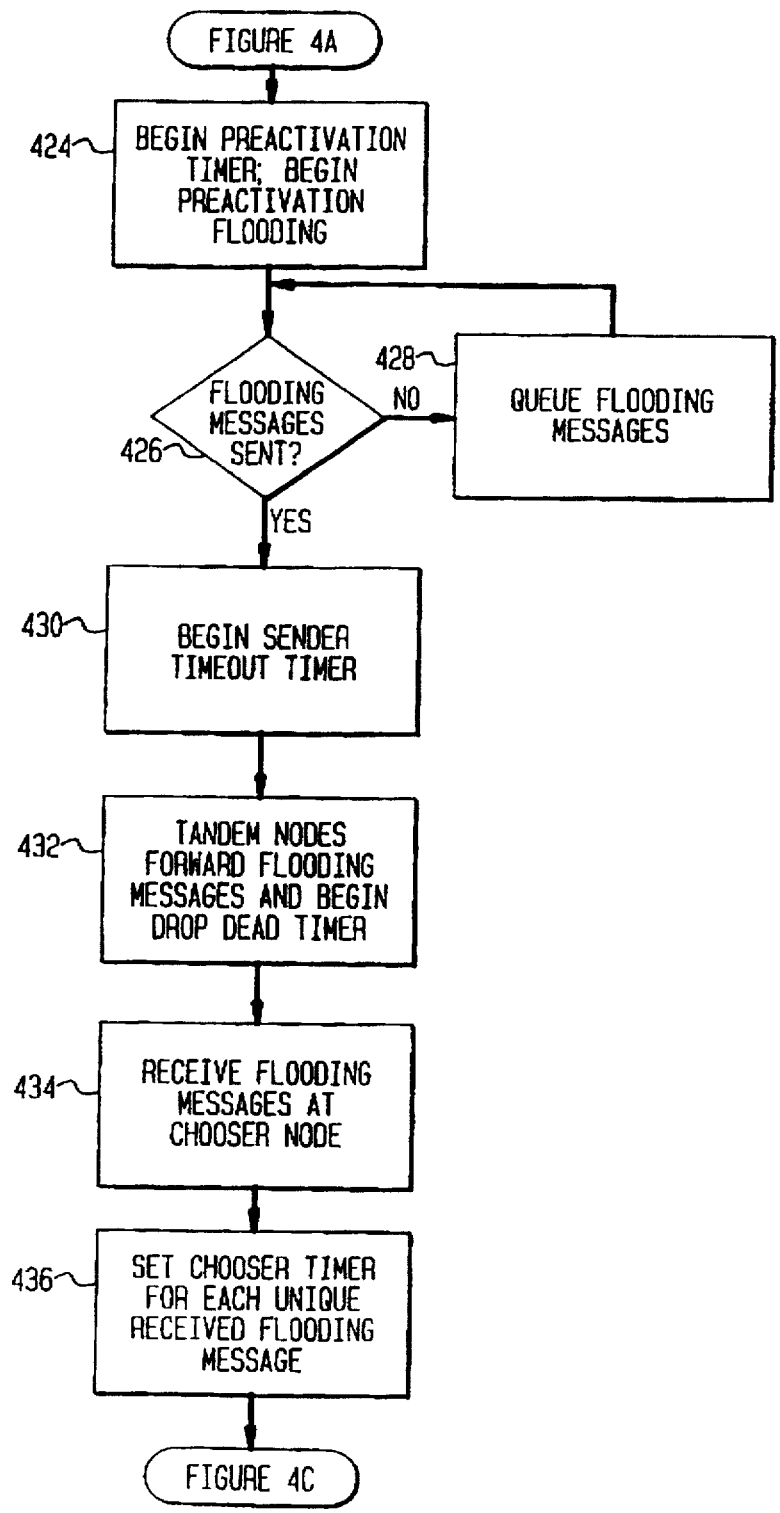

1

IMPLEMENTATION PROTOCOL FOR SHN-BASED ALGORITHM RESTORATION PLATFORM

Cross-Reference to Other Applications

The following copending applications of common assignee contain some common disclosure.

"Communication System and Method Providing Optimal Restoration of Failed Paths," Ser. No. 08/715,323, filed Sep. 18, 1996 incorporated herein by reference in its entirety.

"Method and System for Resolving Contention of Spare Capacity Circuits of a Telecommunications Network," Ser. No. 08/468,302, filed Jun. 6, 1995 incorporated herein by reference in its entirety.

"System and Method Therefor of Estimating Optimal Spare Capacity for a Distributed Restoration Scheme," Ser. No. 08/493,477, filed Jun. 22, 1995, incorporated by reference in its entirety.

"System and Method for Resolving Substantially Simultaneous Bidirectional Requests of Spare Capacity," Ser. No. 08/483,578, filed Jun. 7, 1995, incorporated herein by reference in its entirety.

"Automated Path Verification for SHN-Based Restoration," Ser. No. 08/483,525, filed Jun. 7, 1995, now U.S. Pat. No. 5,623,481,incorporated herein by reference in its entirety.

"System and Method for Reconfiguring a Telecommunications Network to its Normal State After Repair of Fault," Ser. No. 08/493,741, filed Jun. 22, 1995, incorporated herein by reference in its entirety.

"Automation Restoration of Unrestored Link and Nodal Failures," Ser. No. 08/483,579, filed Jun. 7, 1995, incorporated herein by reference in its entirety.

BACKGROUND OF THE INVENTION

1. Field of the Invention

The present invention relates generally to telecommunications networks, and more specifically is directed toward a system and method for restoring disrupted connections after a network failure.

2. Related Art

A telecommunications network comprises a plurality of nodes connected together by logical spans that may comprise links of optical fibers. If any of the fibers are cut, the traffic through a portion of the network is disrupted. In conventional solutions, automatic protection switching (e.g., 1:1 or 1 N) moves disrupted traffic to dedicated spare circuits promptly, typically in less than 50 milliseconds. However, this automatic protection switching requires a high dedicated spare channel capacity.

Similarly, self-healing rings (e.g., unidirectional or bidirectional) suffer from the same problem of high dedicated spare channel capacity. In this network solution, a common protection ring is shared by all of the nodes on the ring. Although switching times are attractive in ranging from 50–200 milliseconds, self-healing rings prove inflexible when considering provisioning, growth and maintenance issues. Moreover, self-healing rings are limited in their response to multiple failure scenarios.

Digital cross connect mesh architectures, on the other hand, provide the maximum flexibility in responding to network failures. In these systems, each node contains one or more digital cross connect systems that connect via logical spans to a plurality of other nodes in a mesh-like configuration. The spare capacities in each of the logical spans contributes to the survivability of other spans in the network.

There are two distinct types of digital cross connect mesh architectures: centralized and distributed. In a centralized mesh architecture, a centralized intelligence has a built in knowledge of the different nodes and links of the network and a defined solution for a particular failure scenario. A disadvantage of this scheme is that the topology of the network has to be stored in a centralized database that requires updating any time a network change occurs (e.g., addition or removal of links). Additionally, the restoration time is typically on the order of minutes.

In a distributed mesh architecture, the intelligence is distributed in each of the nodes of the network. This intelligence is created through a variety of signaling messages that are passed between adjacent nodes. Currently, there are two types of distributed restoration schemes: span (or link) based and path based. In path based schemes, the shortest and/or most reasonable end-to-end alternate route throughout the network is found.

In link based schemes, on the other hand, the shortest and/or most reasonable alternate route is identified between the nodes adjacent to the failed link. One example of a conventional link based solution is described in U.S. Pat. No. 4,956,835 to Grover and Grover, W., "Distributed Restoration of the Transport Network," *Network Management into the 21st Century*, Chapter 11, IEEE Press, which are herein incorporated by reference in their entirety. In these references, Grover describes generally the signaling requirements in the different phases of the distributed mesh recovery process.

SUMMARY OF THE INVENTION

The present invention provides a system and method for restoring communication between at least one pair of nodes in a network having a plurality of nodes and a plurality of links interconnecting the nodes.

In a pre-failure state, each node in the network sends null messages to adjacent nodes on a single circuit (e.g., STS-1) on all working, spare and open links. The null messages comprise a transmitting node ID field and a link ID field.

After an alarm is detected in a link between a first node and a second node, an alarm validation timer and a holdoff timer are started. The alarm validation timer validates the alarm while the holdoff timer prevents link restoration due to short-duration hits.

To isolate the fault detected on the failed link, the adjacent nodes insert an incoming signal failure (ISF) maintenance signal downstream from the failed link. The ISF maintenance signal functions to quiet downstream links in alarm.

After the alarm is validated, a sender node and a chooser node are identified based on an arbitration between the first node and the second node adjacent to the failed link. The sender node then starts a preactivation timer.

Next, the sender node sends a flooding message for each link on the span with a validated alarm, comprising a sender node ID field, an index field, a chooser node ID field and a hop count field, on one spare link on each logical span between the sender node and any of the plurality of nodes in the network connected to the sender node. The sender node then starts a sender time-out timer.

Upon receipt of a unique flooding message, the chooser node starts a chooser timer. After the chooser timer has expired, the chooser node selects a shortest restoration route and sends a reverse linking message on the shortest restoration route. The reverse linking message comprises a sender node ID field, an index field, and a chooser node ID field.

After the sender node reserves a link restoration route based on a received reverse linking message, the sender node sends release messages on all other spare links separate from the link restoration route which were flooded for that same link failure. Upon expiration of the holdoff timer, the sender node sends a connect message to the chooser node. The connect message comprises a "restore from" field that identifies the specific failed link to the chooser node for correct cross connection of the restored circuit to the surviving side normal path.

Finally, after the preactivation timer expires, the sender node releases any reserved and unused restoration routes which may have been reserved in anticipation of additional link failures (pre-emptive activation flooding).

BRIEF DESCRIPTION OF THE FIGURES

The foregoing and other features and advantages of the invention will be apparent from the following, more particular description of a preferred embodiment of the invention, as illustrated in the accompanying drawings.

FIGS. 4 and 4A–4D illustrate the network restoration protocol of the present invention.

DETAILED DESCRIPTION OF THE PREFERRED EMBODIMENTS

Figure 1:
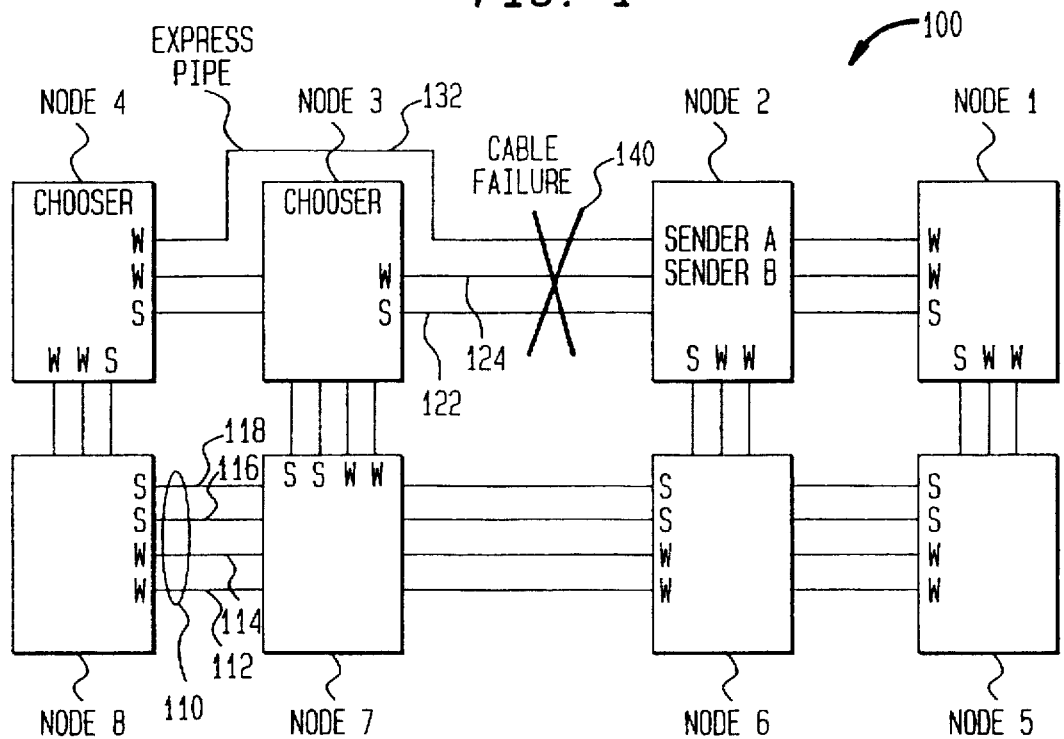
FIG. 1 illustrates an example of a network layout.

The following description of the network restoration protocol according to the present invention is separated into three distinct parts. In the first part, the general network and node environment are described. In particular, the effect of link (or span) based restoration on network configurations and digital cross-connects (DXCs) within a plurality of nodes is examined.

In the second part, a description of a preferred embodiment of the network restoration protocol is provided. This description is further segmented into subparts that include pre-failure communication and failure detection, forward flooding, reverse linking and connection.

Finally, in the third part, a description of the general signaling scheme is provided. This signaling scheme defines specific message formats for each type of signaling message (e.g., null message, flooding message, etc.) and the transport vehicle within the synchronous optical network (SONET).

In the following section, terms having specialized meaning and that are frequently used are defined.

1. Terms and Definitions

Access/Egress Nodes—The nodes where a DS-3/STS-1/OC-12 circuit enters and exits the spans protected by a dynamic transmission network restoration (DTNR) network.

Access/Egress Port—The STS-1/DS-3 port where a circuit enters and exits the DTNR platform by cross-connecting to a working link. Adjacent Nodes—The digital cross-connects (DXCs) that are connected directly to a common span (usually in the context of a common span that has failed).

Alarm validation—The ending of the wait for upstream DXCs or line terminating equipment (LTEs) to either insert incoming signal failure (ISF) maintenance signal into the failed link or restore the traffic via automatic protection switching around electronics failures.

Alt-Route—The set of spare channel links which could substitute for a failed working channel link which has failed due to fiber failure.

Chooser node—A custodial node which serves as the egress point from the alt-route into the normal path. The chooser node receives flooding messages and reserves an alt-route by transmitting a complementary reverse linking message back to the sender node.

Chooser Reverse-linking Timer—Forces the chooser node to wait for possible later-arriving messages of the same sender/chooser/index that have a lower hop count decrement.

Circuit—A DS-3, STS-1, STS-Nc or OC-Nc or any constituent signal that is routed and switched through the DTNR network.

Complement Message Pair—Formed when a flooding message with a specific sender/chooser/index matches a reverse-linked message of the same sender/chooser/index.

Custodial Nodes—The nodes that are adjacent nodes to a failed span.

Drop Dead Timer—A timer in each node that when expired, will indicate a software lockup and reset the DXC control system.

DTNR—Dynamic Transmission Network Restoration. The network of DXCs, links and software that performs a distributed, dynamic control of the restoration function.

Flooding Message—Messages which search the restoration spare capacity for acceptable alt-routes (on a link-by link basis) which connect the sender and chooser nodes.

Holdoff timer—The timer that forces a validated alarm to persist for a prescribed time interval so as to prevent DTNR activation as a result of intermittent short-duration hits.

Hop Count—A value pre-configured at the sender node on flooding messages that's decremented by one at each tandem and chooser node. Nodes will not forward flooding messages whose hop count has decremented to zero. This serves to limit the flooding across a network.

Index—Flooding messages sent on a particular spare link will include a unique index number which, along with the sender node and chooser node IDs, allows multicasted messages to be identified as such by the tandem and chooser nodes.

Incoming Signal Failure—A maintenance signal that indicates an upstream STS-1 failure. Serves to quiet downstream alarms in link fault isolation. DTNR will convert ISF back to the appropriate alarm indication signal (AIS) when a circuit exits the DTNR network.

Link—A bidirectional OC-N (express pipe) signal between two adjacent nodes. The OC-N may not add-drop any of it's constituent signals between DTNR nodes, but is allowed to do so at the nodes. More generally, a link signal has an arbitrary rate/format and comprises a plurality of constituent signals.

Node ID—A number unique to DTNR that is used by the algorithm.

Normalization—The cross-connection of restored traffic back to its original route (after fiber repair).

Null messages—These messages are sent repetitively during normal network conditions to identify logical spans, working links, spares and unused or "open" circuits.

Open Link (and Port)—Unequipped link earmarked for future growth. Used as a spare link in restoration. Can be changed to a working link when new traffic is added to the DTNR platform.

Path—A series of links of a given circuit which traverse the entire DTNR network.

Port—A port is the interface from the link to the DXC. In DTNR, its either a DS-3, electrical STS-1, or an OC-12.

Preactivation Timer—Set upon alarm validation, it expires to end the wait for additional link failures and triggers the release of reserved but unused alt-routes.

Precursor port—The port where a particular flooding message was received at a tandem node. Tandem nodes multicast these flooding messages. Tandem nodes will pass the complementary reverse-linking message back toward its sender node from this port.

Restoration event—The triggering and execution of the DTNR in response to a fiber cut. The event lasts until sender time-out. Multiple sender/choosers create multiple events.

Route—Any series of links which are connected.

Span—The set of all parallel links between two adjacent nodes, whether they are on the same transmission system or not.

Spare Link—An operational link which is not transporting working channel traffic and can be accessed by the DTNR to restore failed links.

Unrestored Outstanding Alarm—A link which was not restored in the previous event and is still in alarm.

Working Link—An operational link which is transporting working channel traffic under normal (non-alarmed conditions).

2. Environment

The following subsections provide exemplary configurations both in the network environment and at the node environment.

a. Network Environment

FIG. 1 illustrates an exemplary telecommunications network 100 that contains 8 nodes (1–8). Connectivity between nodes 1–8 is provided by a number of working links (W) and a number of spare links (S). In a general mesh architecture there is no limit or constraint on the extent of connectivity between nodes 1–8.

In telecommunications network 100, each node is connected to another node by a span. For example, span 110 connecting adjacent nodes 7 and 8 contains working links 112 and 114 and spare links 116 and 118. Each of working links 112 and 114 and spare links 116 and 118 is connected to a port on a digital cross connect (DXC) in nodes 7 and 8.

The interconnection between nodes 2, 3 and 4 represents a unique characteristic of network design. In addition to the connection of adjacent nodes 2 and 3 via working link 124 and spare link 122, node 2 is also connected to node 4 via link 132. Link 132 is an express pipe (or "glass through") through node 3. This anomaly of network design may occur due to limited rights of way afforded to the company that implements telecommunications network 100.

Significantly express pipe 132 increases the risk of a multiple failure scenario within telecommunications network 100. For example, if cable failure 140 occurs, the traffic between nodes 2 and 3 and the traffic between nodes 2 and 4 will be disrupted.

Generally, a single restoration event begins with an arbitration between the nodes adjacent to the failure to determine which node will act as a sender node or a chooser node (this arbitration process is described below). For the example in FIG. 1, node 2 is determined to be the sender node with respect to both nodes 3 and 4 that are identified as chooser nodes. For convenience, node 2 is termed "sender A" with respect to node 4 and "sender B" with respect to node 3.

After sender/chooser arbitration is complete, the sender node sends preactivation flooding messages on spare links to identify alt-routes. The sender node essentially seeks to reserve as much spare capacity as it needs to provide for eventual failures in all the working links on the span. If multiple sender/chooser pairs exist, a race condition results. The "greedy characteristic" of each sender dictates that a single sender may reserve an excessive number of alt-routes. This precludes the second sender from utilizing some of the unneeded reserved spare capacity.

Figure 2:
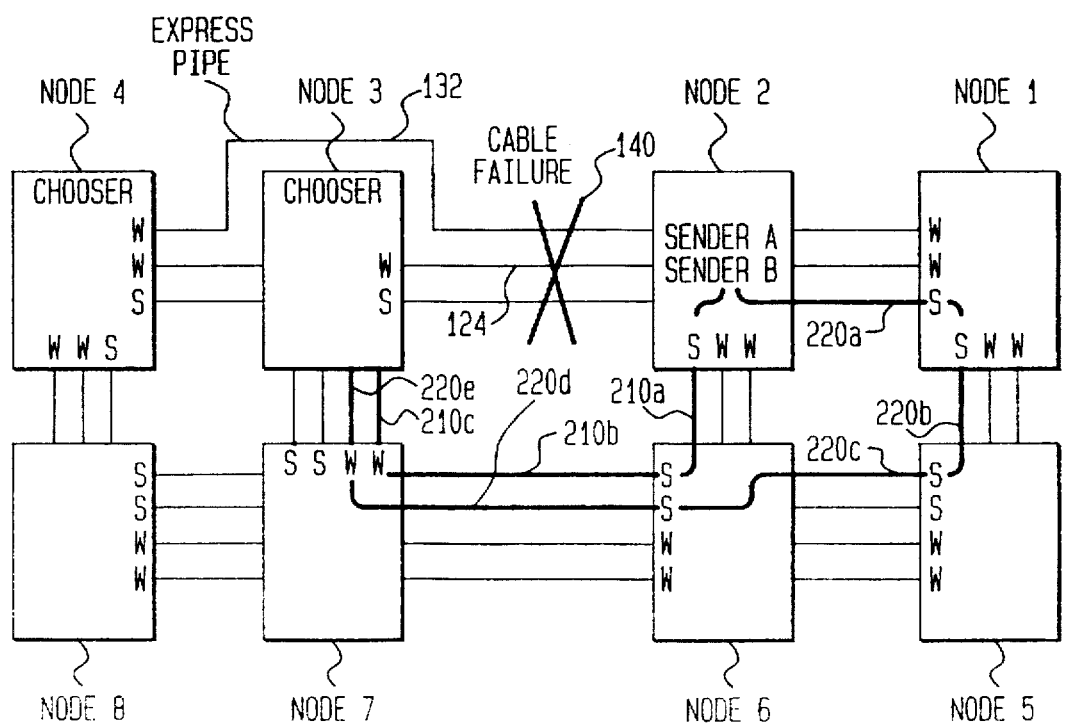
FIG. 2 illustrates the span (or link) restoration of a network in response to a failure.

FIG. 2 illustrates an example of the necessity of an effective arbitration method between restoration events. In this example, the restoration event between nodes 2 and 3 is presumed to have begun prior to the restoration event between nodes 2 and 4. As illustrated, sender B has reserved two altroutes between nodes 2 and 3 using available spare links. The first alt-route 210a–210c extends from node 2 to node 6 to node 7 to node 3. The second altroute 220a–220e extends from node 2 to node 1 to node 5 to node 6 to node 7 to node 3. The second alt-route 220a–220e is not needed by sender B since the first alt-route 210a–210c restores the only link 124 in alarm between nodes 2 and 3. Link 132 in alarm between nodes 2 and 4 is therefore precluded from using the spare capacity represented by links 220a–220d.

b. Node Environment

Figure 3:
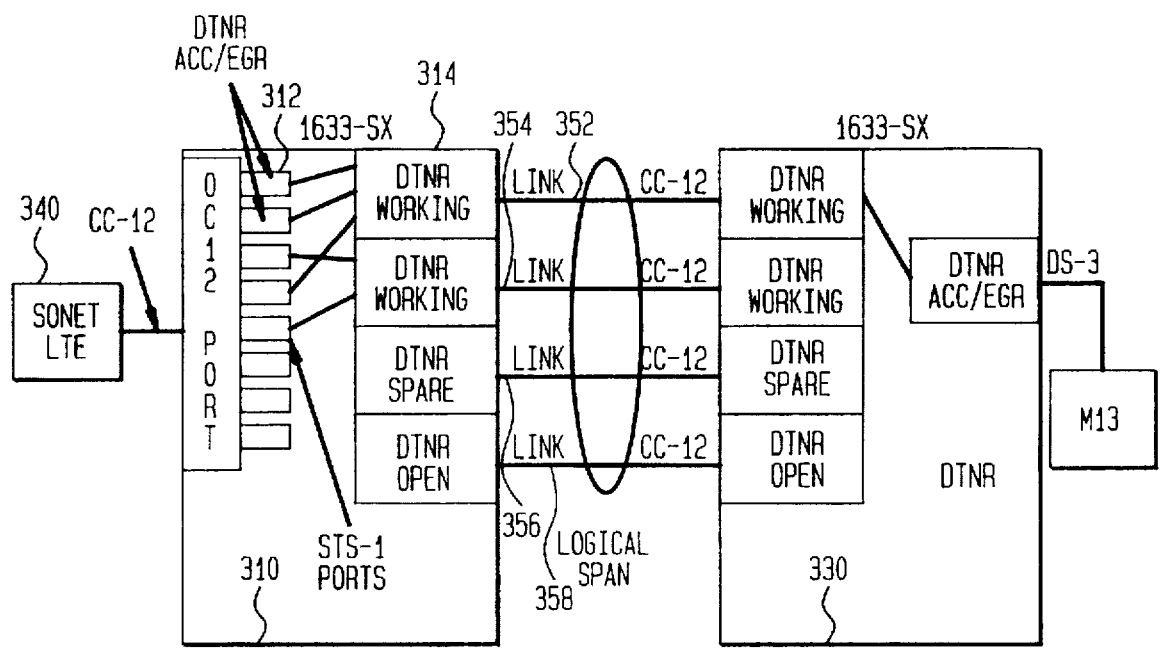
FIG. 3 is a high-level block diagram used to illustrate a logical span between two digital cross connect systems.

In one embodiment, the DXCs provisioned at each of nodes 1–8 are each a model 1633-SX made by the Alcatel Network Systems Company. In other embodiments, equivalent DXC systems can be used to implement the features of the present invention. A high level block diagram of this system is illustrated in FIG. 3. Each DXC 310, 330 has a plurality of ports 312 that are multiplexed into a line terminating equipment (LTE) such as synchronous optical network (SONET) LTE 340. Each DXC 310, 330 has two working links 352, 354, one spare link 356 and one open link 358. Working links 352, 354 correspond to working links (W) in FIG. 1. Spare Link 356 corresponds to spare links (S) in FIG. 1. Open link 358 is reserved for later usage as a working link. In one embodimeent, each link 352, 354, 356, 358 is a conventional optical carrier OC-12 fiber. In other embodiments, each link can be a higher order OC-N signal (e.g., OC-48 or OC-192 fiber). As would be apparent to one of ordinary skill in the relevant art, a link can also be defined in non-SONET environments. In these cases, the link has a specified rate and format and contains a plurality of constituent signals.

Referring to FIG. 3, a received OC-12 signal is routed through dynamic transmission network restoration (DTNR) interface cards 314 to a number of STS-1 ports 312 for transmission to SONET LTE 340. In one embodiment, DTNR interface cards 314 comprise a detector that detects a failure in the link coupled to DTNR interface card 314. In other embodiments, the detector may reside in SONET LTE 340. A processor (not shown) provides the intelligence for DXC 310, 330. A database (not shown) stores a mapping that identifies the various sender nodes, chooser nodes and links.

3. Dynamic Transmission Network Restoration Protocol

FIGS. 4A–4D illustrate flow diagrams for the dynamic network restoration protocol according to the present invention. The relation between FIGS. 4A–4D is illustrated by FIG. 4.

a. Pre-Failure Communication and Failure Detection

Figure 4:
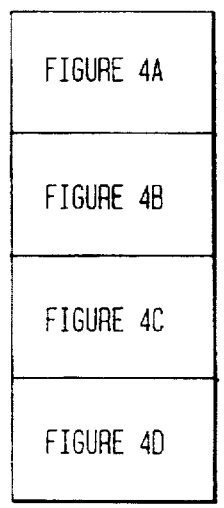
Figure 4A:
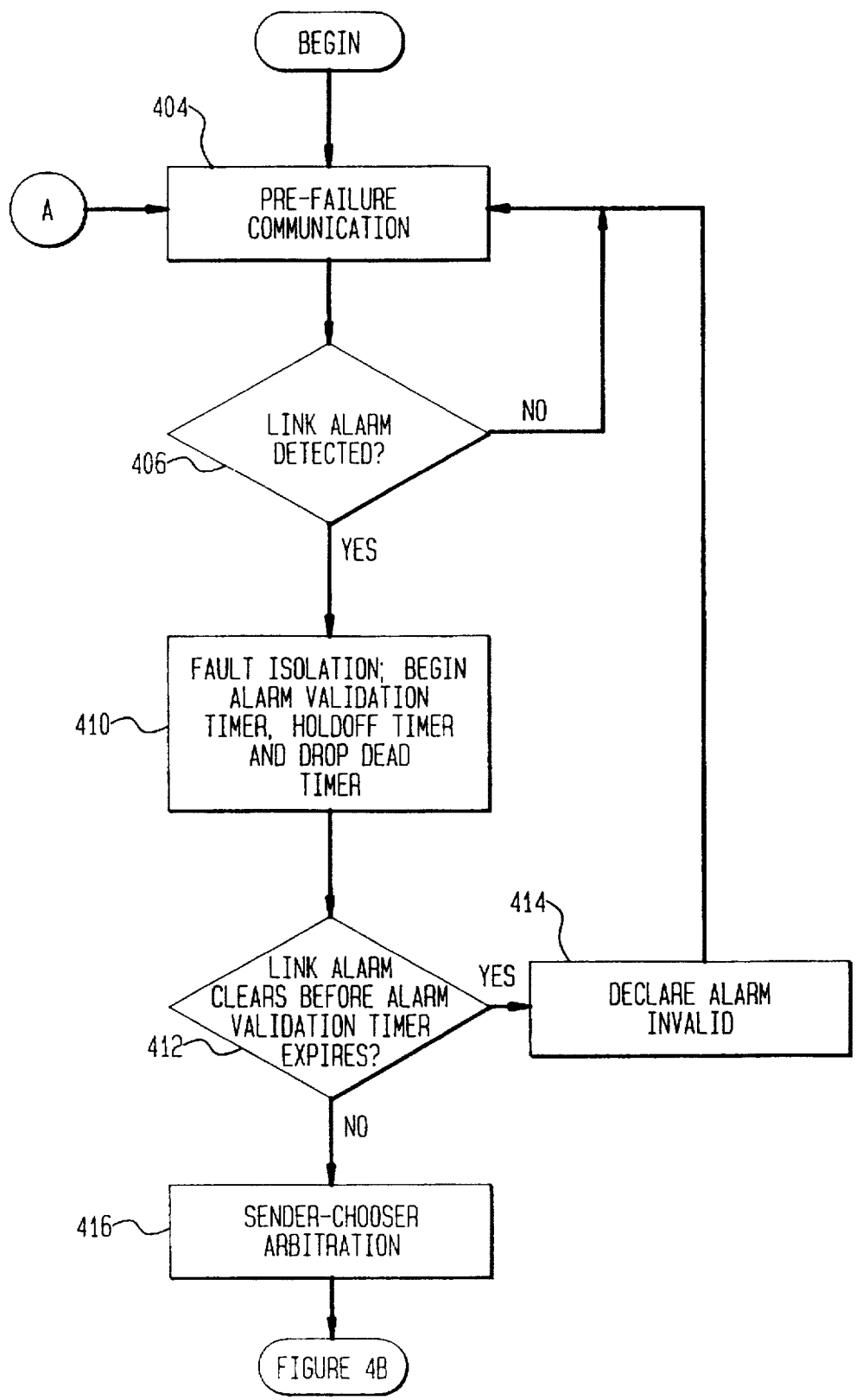

In FIG. 4A, the process begins in step 404 where pre-failure communication between nodes occurs. The communication in step 404 represents the general state of the DTNR network prior to a cable failure (e.g., cable cut). In this state, null messages 900 are exchanged between adjacent nodes on all working, spare, and open links 252–258.

Figure 5:
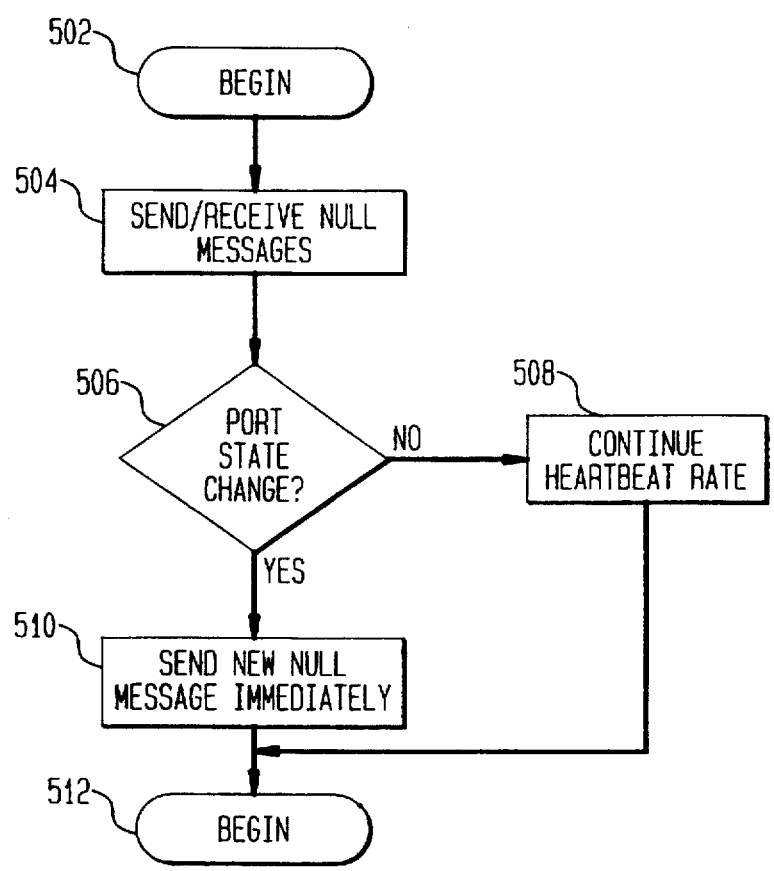
FIG. 5 is a flow chart of communication in the pre-failure state.

Step 404 of FIG. 4A is illustrated in more detail by the flow diagram of FIG. 5. In step 504, each node sends and receives null messages 900 via a single STS-1 in working, spare and open links 252–258. In step 506, a node determines whether any port change has been made. If no port change has been made, in step 508, She node continues transmitting null messages 900 according to its predefined periodic rate (or heartbeat). However, if a port change has occurred, a node immediately sends a new updated null message 900 in step 510.

Figure 9:
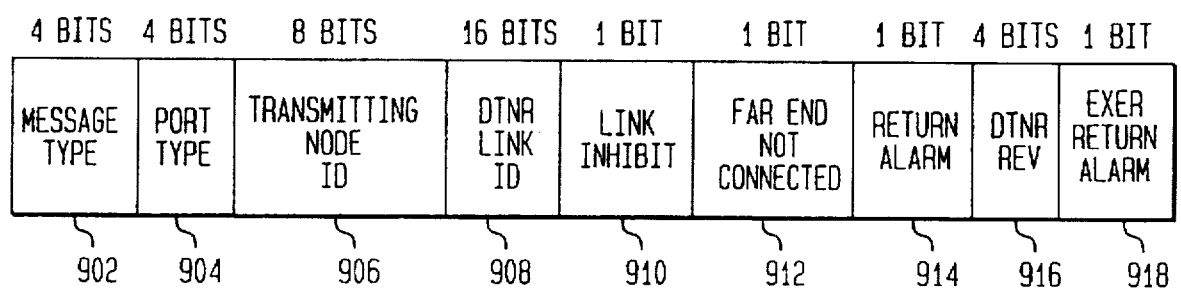
FIGS. 9–13 illustrates the structures of messages used in the network restoration protocol.

In a preferred embodiment, null messages 900 comprises information fields 902–918 as illustrated in FIG. 9. A detailed description of information fields 902–918 is provided in Section 4.a below.

Generally, transmitting node ID field 906 of null message 900 identifies which node a receiving port 314 is connected to. Additionally, link ID field 908 of null message 900 automatically identifies the link that carries null message 900. The unique combination of node number and link number enables the nodes adjacent to a fiber cut to cross-connect the proper circuit into a given restoration route.

Continuing at step 406 in FIG. 4A, the nodes in the DTNR network determine whether any link alarms have been detected. As noted above, the link failure detector may reside in DTNR interface card 314 or SONET LTE 340. Generally, the receipt of either all 12 STS-Path alarm indication signals (AISs), OC-12 loss of signal (LOS), loss of pointer (LOP), loss of frame (LOF), or the return alarm bit in return alarm field 914 in null message 900 is considered an alarm. In a preferred embodiment, all path AISs in all 12 STS-1s in the OC-12 are required to be received prior to indication of a link failure to insure that upstream failures will not falsely activate the restoration protocol. In other embodiments, line AISs could be used for link failure detection depending upon their visibility relative to the fault detection means.

Figure 6:
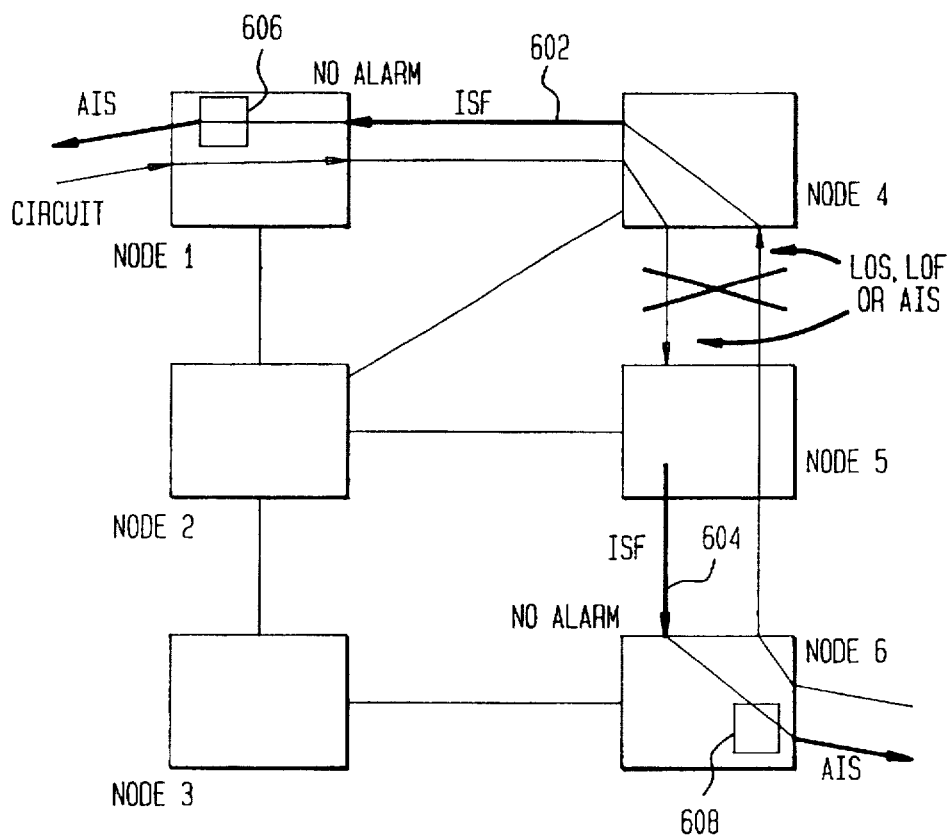
FIG. 6 illustrates a fault isolation process.

If no link alarm is detected, the DTNR network continues the process of sending null messages 900 in step 404. If a link alarm is detected, a fault isolation process is initiated in step 410. This fault isolation process is illustrated in FIG. 6.

In a preferred embodiment, the nodes adjacent to the failure insert an incoming signal failure (ISF) maintenance signal into downstream links within 30 ms of link alarm detection. This ISF maintenance signal insertion serves to quiet downstream links that cascade into an alarm state. In FIG. 6, nodes 4 and 5 are adjacent to a link in alarm. Within a predefined period of time, nodes 4 and 5 would insert an ISF maintenance signal into downstream links 602 and 604 respectively to indicate that the failure is upstream. For node 4, the ISF signal is inserted into downstream link 602 connecting node 1 and node 4. For node 5, the ISF signal is inserted into downstream link 604 connecting node 5 and 6.

The insertion of the ISF maintenance signal takes links 602 and 604 out of alarm status and assures that only a single pair of nodes detects a fault. This serves to isolate the fault. Finally, access/egress ports 606 and 608 in access/egress nodes 1 and 6 change the ISF maintenance signal back to a standard AIS so that signals leaving the DTNR network remain standards-compliant.

Referring again to step 410 of FIG. 4A, in addition to the fault isolation process, link alarm detection in step 406 also triggers the start of alarm validation timer 702 and holdoff timer 704 (FIG. 7) in the sender node. Alarm validation timer 702 forces the DTNR network to wait for any automatic protection switching (APS) to correct the failure before activating the network restoration protocol. More generally, alarm validation timer 702 prevents restoring traffic to alt-routes if the link alarm signifies intermittent problems that are repairable by the node itself or any intermediate LTEs. In one embodiment, alarm validation timer 702 is predefined to expire after 100 ms. This user-configurable value can be adjusted to allow any dedicated protection strategies to operate before initiating the network restoration protocol.

In step 410, holdoff timer 704 is started in the sender node at the same time as the start of alarm validation timer 702. Holdoff timer 704 is designed to hold off the restoration process of the system until there is a clear determination that the restoration is not premature. In other words, holdoff timer 704 prevents restoration for intermittent failures that cause short-duration hits to the link. In one embodiment, holdoff timer 704 expires in 300 ms. Holdoff timer 704 is also user configurable. However, alarm validation timer 702 is restricted to expiration times that are less than holdoff timer 704.

It should be noted that alarm validation timer 702 and holdoff timer 704 are initiated in the sender node. Thus, if a simplex failure is detected at the chooser node, the sender node would not start alarm validation timer 702 and holdoff timer 704 until the sender node received a one in return alarm field 914 in the next null message 900 sent by the chooser node.

Figure 7:
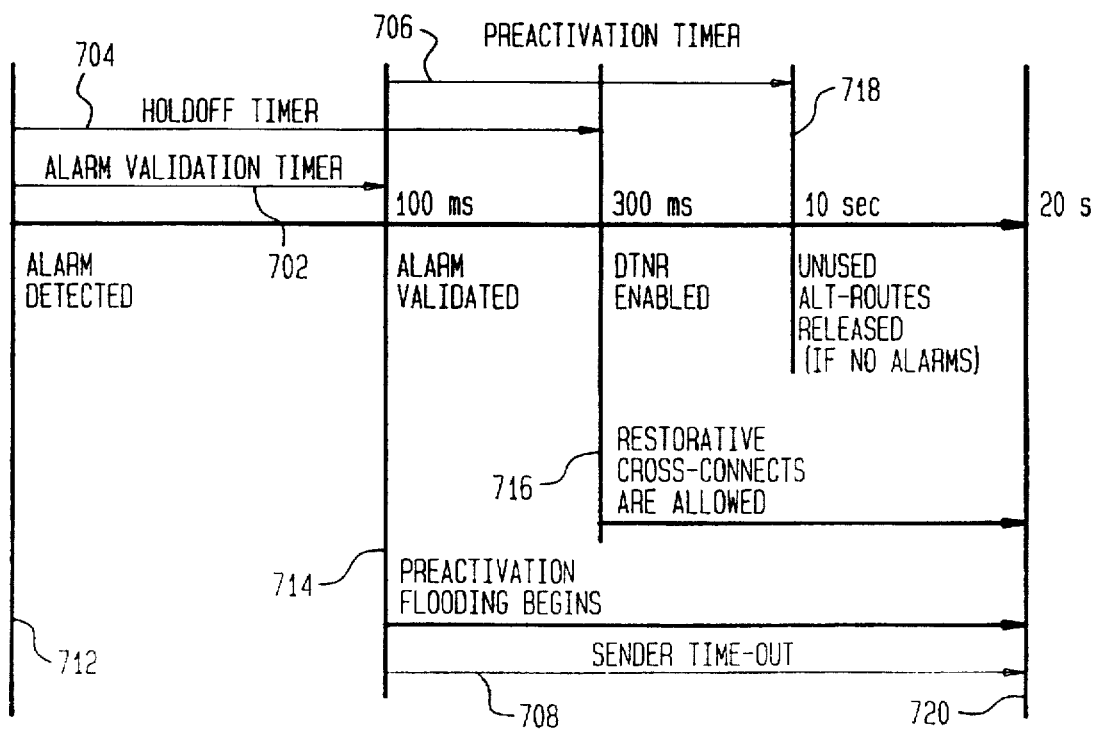
FIG. 7 illustrates the relation between various timers within the network restoration protocol.

The impact of alarm validation timer 702 and holdoff timer 704 to the network restoration process is further illustrated in FIG. 7. As noted above, alarm validation timer 702 delays the preactivation flooding process by the sender node. Preactivation flooding is described in greater detail below. Holdoff timer 704, on the other hand, delays any restorative cross connects required to implement alt-routes.

Finally, in step 410, the sender node and the chooser node also start a drop dead timer. The drop dead timer is set sufficiently long so that it should never expire in normal operation. If the drop dead timer expires, it signals that a software problem has probably occurred and will return the node to a control system reset state and wait for manual control.

Continuing at step 412 of FIG. 4A, the sender node determines whether the link alarm clears before alarm validation timer 702 expires. If the link alarm does clear, the alarm is declared invalid in step 414. Thereafter, the DTNR network returns to the pre-failure communication state. However, if the link alarm persists through alarm validation timer 702, the link alarm is validated and preactivation flooding for alt-routes begins. In the context of FIG. 7, the link alarm is initially detected at time period 712 and preactivation flooding begins at time period 714 after the expiration of alarm validation timer 702.

b. Forward Flooding

Preactivation flooding begins after sender-chooser arbitration in step 416. In this arbitration process, a node adjacent to a failed link performs a comparison of its own node ID to the node ID of the node opposite the failed link. The node ID of the node opposite the failed link is identified through null messages 900 previously received. Specifically, a node relies upon the value of transmitting node ID field 906 in a previously received null message 900.

Specifically, in arbitration process 416, a node determines whether its own node ID is a smaller number than the node ID of the node opposite the failed link. If its node ID is smaller, then it assumes the role of the sender node. If its node ID is larger, then it assumes the role of the chooser node. The node opposite the failed link (which is also in alarm on that link) does the same comparison to determine it's role. In the context of failure 140 in FIG. 1, node 2 has a smaller ID relative to nodes 3 and 4. Thus, in this example, node 2 assumes the sender role to both node 3 and node 4.

After a node identifies itself as a sender node, the sender node begins preactivation timer 706 and the preactivation flooding process in step 424. Preactivation timer 706 sets a user-configurable time period (e.g., 10 seconds) that forces the release of reserved alt-routes if no other links are in alarm. More specifically, preactivation timer 706 addresses the "greedy characteristic" by arbitrating the competition between multiple sender nodes.

Once the first alarm on a given logical span is validated, the sender node begins the preactivation flooding process in step 424. Preactivation flooding assumes that all other links on that logical span will fail eventually. Accordingly, the preactivation flooding process searches for restoration routes for all links on each failed logical span regardless of whether each link is currently in alarm. Once alt-routes are found, they are stored in the sender node's memory until holdoff timer 704 has expired.

Specifically, the sender node attempts to send, for each working link in alarm (both actual and assumed), a flooding message 1000 in a single STS-1 of one spare link of each logical span available (excluding the failed logical span). Flooding message 1000 comprises sender node ID field 1004, chooser node ID field 1006 and index field 1008. Index field 1008 identifies the port number for the spare link that the sender floods. The contents of flooding message 1000 is described in greater detail in Section 4.b.

If, in step 426, the sender node determines that flooding messages 1000 could not be sent due to the unavailability of spare links, the sender node queues flooding messages 1000 in step 428. This situation may occur if flooding messages 1000 from a previous failure event have already been sent on the spare links extending from that sender node. If, on the other hand, the sender node determines that flooding messages 1000 were sent, the sender node begins sender timeout timer 708 in step 430.

Sender timeout timer 708 sets a user-configurable time period (e.g., 20 seconds) that ensures that preactivation flooding by the sender node, and its subsequent restoration, does not continue indefinitely. In other words, the restoration efforts are bounded to prevent the sender node from tying up the system.

Generally, sender timeout timer 708 is restarted for any new alarm validated links on a previously unalarmed logical span. There is a separate and completely independent sender timeout timer 708 for each unique sender-chooser pair. Additionally, sender timeout timer 708 is restarted if preactivation timer 706 released all unused alt-routes and a new link alarm is validated.

Figure 8:
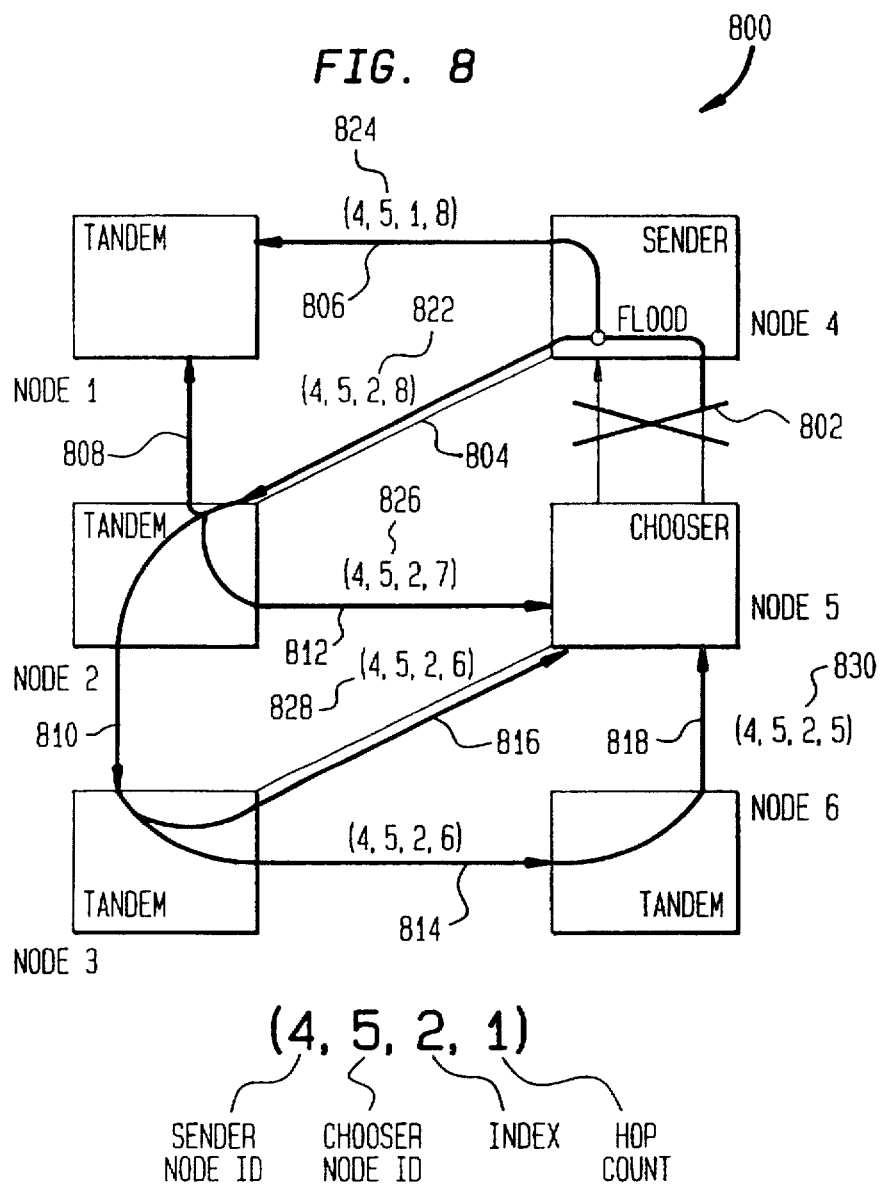
FIG. 8 illustrates flooding messages that are sent between nodes adjacent to a failed link.

An example of the preactivation flooding process is provided in FIG. 8. FIG. 8 illustrates an example of sender/tandem flooding of a single index within network 800. In network 800, cable failure 802 causes at least one working link between nodes 4 and 5 to go into alarm.

In the preactivation flooding process, sender node 4 sends a single flooding message 822 and 824 on a single STS-1 on each spare link on spans 804 and 806, respectively. Flooding message 822 comprises information fields that identify the sender node (4), the chooser node (5), the index (2) and the hop count (8). The use of the hop count field is described in greater detail in Section 4.b. The sender node floods as if all links on that span have failed.

After the transmission of flooding messages 822 and 824 by sender node 4, tandem nodes 1 and 2 forward flooding messages 822 and 824 to further tandem nodes and to chooser node 5. This tandem flooding process is reflected by step 432 of FIG. 4B.

Generally, upon receipt of flooding message 1000, a tandem node multicasts flooding message 1000 to a single spare link in all spans except the one in which it was received, spans which are already flooding that index, or spans which are connected directly to the sender node. In a further embodiment, the tandem nodes prohibit the broadcast of any flooding message 1000 on any spare link's transmit output if a flooding message 1000 (with either the same or a different index) is arriving on that link's receive side. This additional feature aids in the prevention of improper reverse linking. Reverse linking is described in greater detail below.

Additionally, tandem nodes also decrement the hop count by one. By this process, flooding messages 1000 that arrive with a hop count of zero will not be multicast to further nodes. This enforces a maximum hop count limit in any DTNR link restoration.

Finally, each tandem node also starts a drop dead timer upon the first receipt of a flooding message 900. From the tandem node's perspective this indicates the beginning of a distributed restoration event.

Each tandem node stores a copy of each received flooding message 1000. Tandem nodes also store the port number in which flooding message 1000 was received and identifies it as a "precursor" port. This "precursor" port is the root of the multicasting tree of flooding at the tandem nodes. Storage of these "precursor" port values allows a tandem node to identify optimal alt-routes based on a plurality of received flooding messages 1000 having the same index.

As FIG. 8 further illustrates, tandem node 3 multicasts flooding message 800 onto the spare link on spans 814 and 816 and tandem node 6 transmits flooding message 830 onto the spare link on span 818. After the flooding process in FIG. 8 is complete, chooser node 5 receives flooding messages 826, 828 and 830 from tandem nodes 2, 3 and 6, respectively.

c. Reverse Linking

From the chooser node's perspective, the network restoration process begins at step 434 of FIG. 4B. In this step, the chooser node receives flooding messages 1000 that have been sent by either the sender node or any intervening tandem nodes. In step 436, the chooser node begins a chooser timer for each unique flooding message 1000 received. A unique flooding message 1000 is defined as a flooding message 1000 that contains a unique combination of values in sender node ID field 1004, chooser node ID 1006 and index field 1008. The value of hop count field 1010 is used to differentiate between possible alt-routes not flooding messages 1000.

Generally, the chooser timer will force the chooser node to wait for possible later-arriving flooding messages 1000 with the same sender/chooser/index that have lower number of hop count decrements. This scenario often occurs if processing delays at any intervening tandem nodes are highly variable. The chooser timer is user-configurable. In one embodiment, it is set to a value of 100 ms.

In network 800, chooser node 5 would likely receive flooding message 826 first. If the chooser timer has not expired, chooser node 5 would wait for later-arriving flooding messages 828 and 830.

Figure 4C:
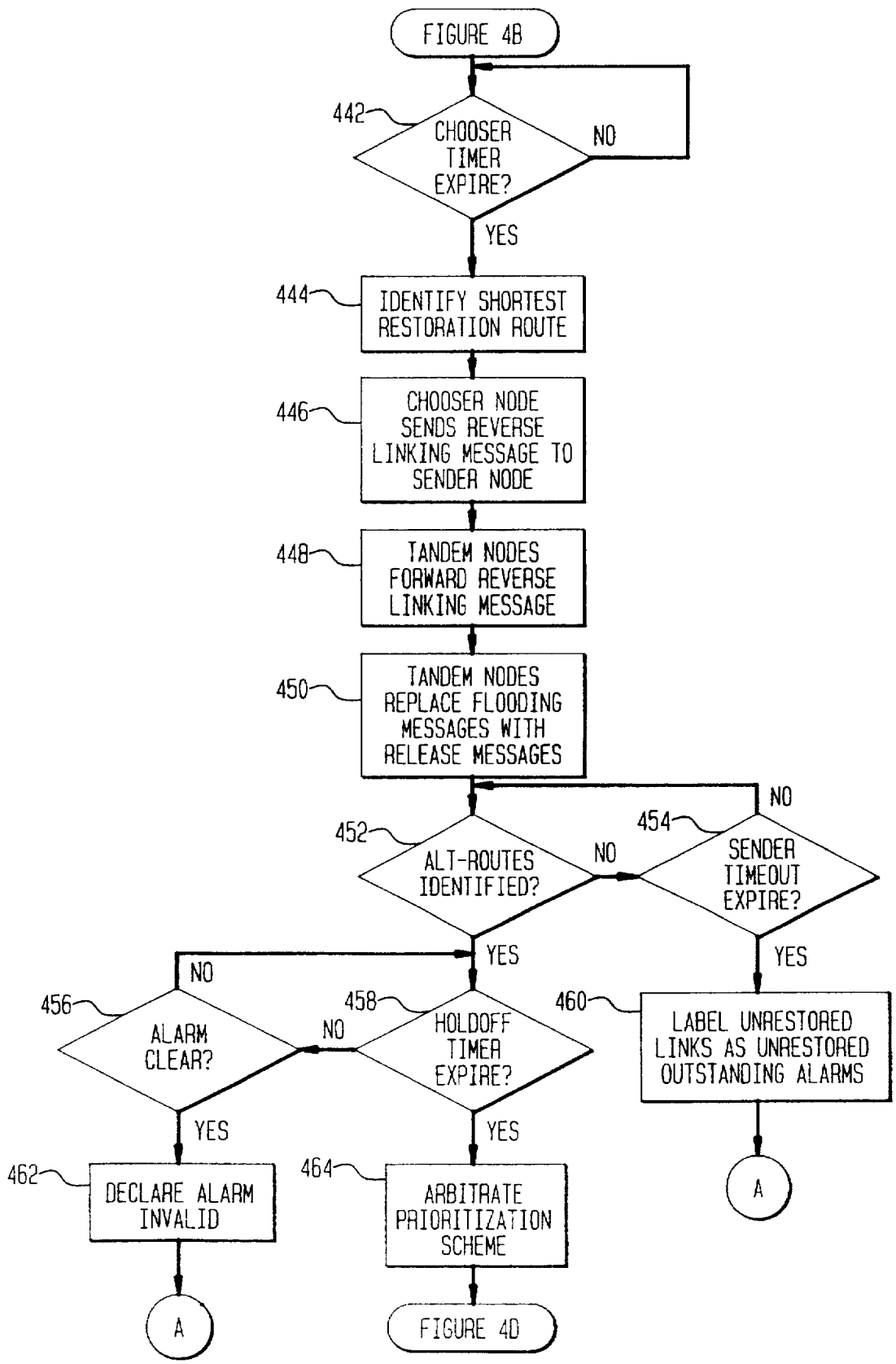

Referring to FIG. 4C, after the chooser node determines, in step 442, that the chooser timer for a particular sender/chooser/index flooding message has expired, it then selects the shortest restoration route in step 444. Specifically, the chooser node will select the shortest restoration route by identifying the flooding message 1000 whose hop count was decremented the least number of times.

In network 800, chooser node 5 would select the shortest restoration route that is identified by flooding message 826. The value of hop count field 1010 in flooding message 826 was decremented one time by tandem node 2. The values of hop count fields 1110 in flooding messages 828 and 830, on the other hand, were decremented two and three times, respectively.

After the shortest restoration route is identified in step 444, the chooser node, in step 446, transmits a reverse-linking message 1100 on the port with the least decremented hop count back to the sender node. All other flooding messages 1000 with the same index are ignored. In FIG. 8, chooser node 5 sends reverse linking message 1100 on the port of the spare link connecting chooser node 5 to tandem node 2. Chooser node 5 ignores flooding messages 828 and 830.

After any reverse linking messages 1100 are sent by the chooser node, the tandem nodes forward reverse linking messages 1100 to the sender node in step 448. Specifically, reverse linking messages 1100 arriving at the tandem nodes are associated with their complementary flooding messages 1000. Reverse linking messages 1100 and flooding messages 1000 are complementary when both include the same unique set of sender/chooser/index values.

The tandem node then stores and forwards reverse linking message 1100 to the precursor port where it had received the original flooding message 1000 of the same sender/chooser/index.

At this point in time, the tandem node may begin to cross-connect the port which received reverse linking message 1100 to the precursor port. In this manner, the cross-connects can be set up while the sender node is waiting for holdoff timer 704 to expire. There is no consequence to making the restorative cross-connects at the tandem nodes ahead of holdoff timer 704 since they are on spare links.

In addition to the forwarding of reverse linking messages 1100 in step 448, the tandem nodes also cease transmission of all multicasted copies of flooding messages 1000 with the same sender/chooser/index. In step 450, the tandem nodes multicast release messages 1200 in their place. The released spare links are now free for the multicasting of other indexes that require restoration routes. Release messages 1200 are sent until there is a demand for another flooding message 1000 with a different sender/chooser/index to be multicasted or until null messages 900 replace all received flooding messages 1000 at that node (whichever comes first).

c. Connection

If an alt-route is available, reverse linking messages 1100 eventually arrive at the sender node. In step 452, the sender node attempts to identify an alt-route based on the receipt of at least one reverse linking message 1100. This waiting process is bounded by sender timeout timer 708. If step 454 determines that no alt-routes have been found prior to the expiration of sender timeout timer 708, the unrestored links are labeled as unrestored outstanding alarms (UOA) in step 460. Thereafter, the system proceeds to the prefailure communication state via path "A".

In one embodiment, if the same sender node receives another link alarm, it will not flood for or restore the UOA. The sender node will limit its flooding for newly-alarmed links (on the same logical span) to flooding for the exact number of alarmed links, as opposed to preactivated flooding. This limits the scavenging by sender nodes which are not likely to find spare capacity.

If reverse linking messages 1100 are received prior to the expiration of sender timeout timer 708, the sender node knows that it has discovered a restoration route. All other flooding for that failed link is suspended by sending release messages 1200 on the spare links that transmitted flooding messages 1000 having the same sender/chooser/index. After the first release message 1200 is sent on a given link, the tandem nodes are free to substitute queued flooding messages 1000 having different sender/chooser/index values.

It should be noted that if the sender node identifies, in step 452, the availability of alt-routes, the sender node will discontinue attempts to send flooding messages 1000 on other spare links for that link failure. This immediately frees up those spares for the flooding of other demand.

Although alt-routes may have been identified by the sender node, the sender node waits till holdoff timer 704 expires before making any restorative cross-connects. Specifically, if the sender node determines, in step 458, that holdoff timer 704 has not expired, the sender node, in step 456, determines whether the link alarm has cleared. If the link alarm has cleared, the sender node, in step 462, declares the alarm invalid and the network restoration process returns to the pre-failure communication state via path "A". If the link alarm does not clear prior to the expiration of holdoff timer 704, the connection process begins.

The connection process begins in step 464 where the sender node first arbitrates a link restoral prioritization scheme. The result of this arbitration process dictates which failed links are restored first.

After the sender node selects a failed link for restoral into the alt-route, in step 468, the sender node identifies the chooser port number to which that link is connected based on the content of its state table. The sender node then includes that port number in restore from field 1304 of connect message 1300. This identifies the restored circuit to the chooser node for correct cross-connection. In a preferred embodiment, the chooser port number is identified based on the value of DTNR link ID field 908 of previously received null messages 900.

Further, in a preferred embodiment, the STS-1s in the alt-route OC-12 are aligned in the same order as they were in the working OC-12. In this way, the individual STS-1s in the OC-12 do not have to be labeled.

Figure 4D:
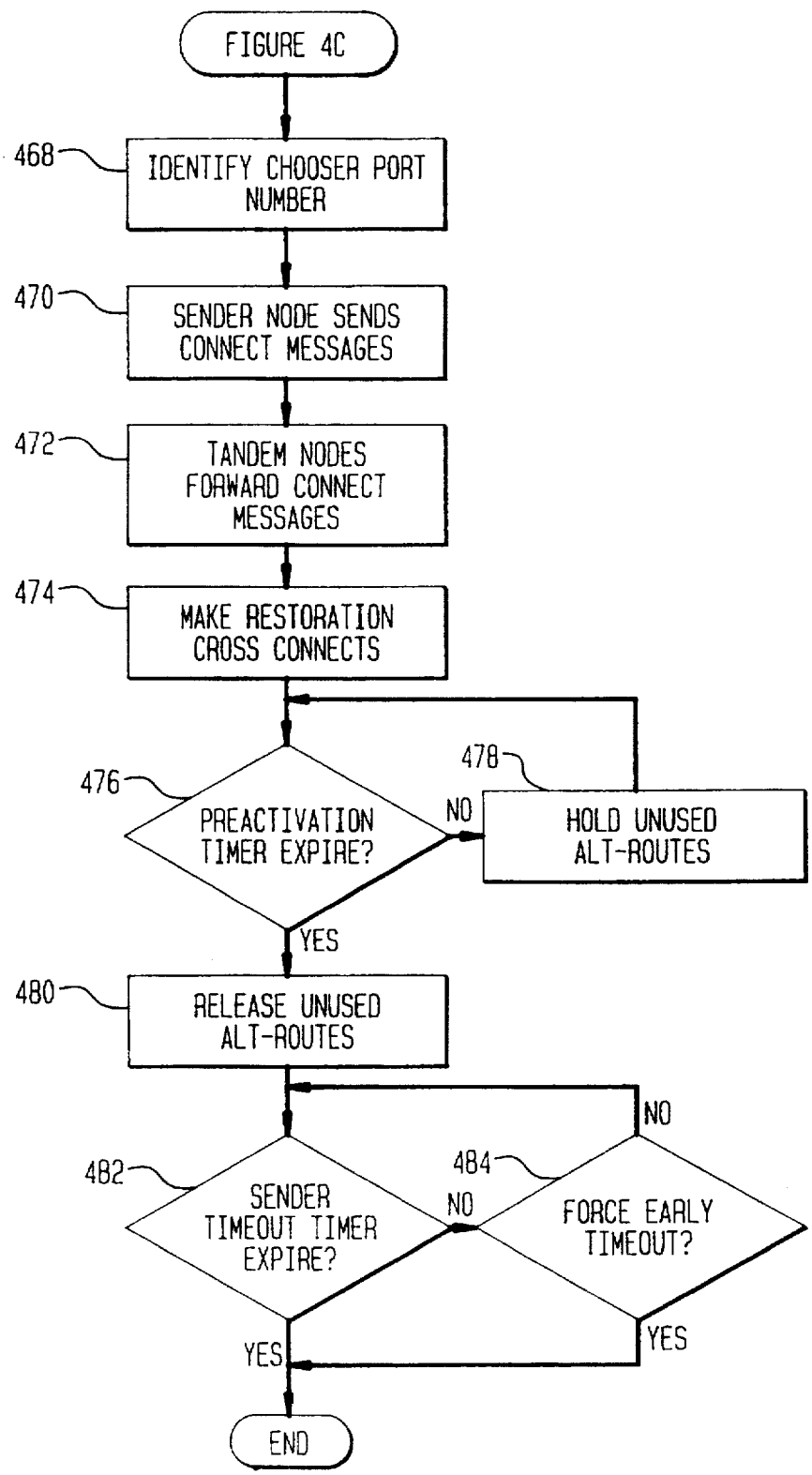

Referring now to FIG. 4D, in step 470, the sender node inserts connect message 1300 into the alt-route circuit. At this point, the restoration function is complete except for the reporting of alarms and status and awaiting normalization commands from restoration management.

Next, in step 472, the tandem nodes store and forward connect messages 1300 regardless of whether the tandem node's restorative cross-connect has been performed yet. This process enhances the speed at which the connect message reaches the chooser node. More generally, this enables the sender node and chooser node to process their restorative cross-connects in a parallel, rather than serial manner. Since cross-connect times comprise a substantial portion of overall system restoration time, the parallel cross-connect processing bypasses a significant performance bottleneck.

After connect message 1300 is received by the chooser node, the chooser node, in step 474, performs the restorative cross-connect identified by restore from field 1304. Specifically, the chooser node determines where the port identified in restore from field 1304 is cross-connected to. The chooser node then makes a new cross-connect from the alt-route to the surviving side of the original path.

If preactivation timer 706 has not expired after the restorative cross connect is made, the sender node continues to hold the reserved alt-routes. This process is illustrated by steps 476 and 478. Specifically, if preactivation timer 706 has not expired, all additional reserved alt-routes are held in step 478. When preactivation timer 706 does expire, the sender node releases, in step 480, the additional reserved alt-routes if no additional links in the logical span are in alarm. It should be noted that the expiration of preactivation timer 706 need not occur after the restorative cross connect. This arrangement in FIG. 4D is selected solely for convenience in describing the general restoration process.

Next, in step 482, the network restoration process determines whether sender timeout timer 708 has expired. Here, it should be noted that sender timeout timer 708 can occur earlier in the restoration process. For this exemplary description, however, sender timeout timer 708 is shown to expire after the release of reserved alt-routes in step 480. Specifically, if sender timeout timer 708 has not expired, the sender node next determines, in step 484, whether or not there is a forced early time out (e.g., by the operator of the system). If there is no forced early time out, the system awaits the expiration of sender timeout timer 708. If a forced early time out occurs or sender timeout timer 708 expires, the process ends.

d. Alternative Embodiment

In an alternative embodiment, the restoration process is reduced from a three-stage process (i.e., forward flooding, reverse linking and connection) to a two-stage process. In the first stage of the two-stage process, forward flooding is performed by the sender node. In the second stage, the chooser node chooses which circuit is restored into the alt-route and alerts the sender node through a reverse linking message. This reverse linking message is a modified version of reverse linking message 1100 and further includes restore from field 1304 of connect message 1300.

To implement this two-stage process, the timer structure of the preferred embodiment is modified in a simple manner. Specifically, holdoff timer 704 and preactivation timer 706 now reside at the chooser node rather than the sender node. Holdoff timer 704 determines when the chooser node can start the connection process while preactivation timer 706 determines when the chooser node releases unused alt-routes.

4. Signaling

Pre-failure communication, link fault isolation and the flooding and reverse linking process use the concept of messages. These messages are periodically repeated over defined overhead bits and have an advantage of low latency since they use only the data link and physical layer. Thus, these messages require minimal processing.

Figure 14:
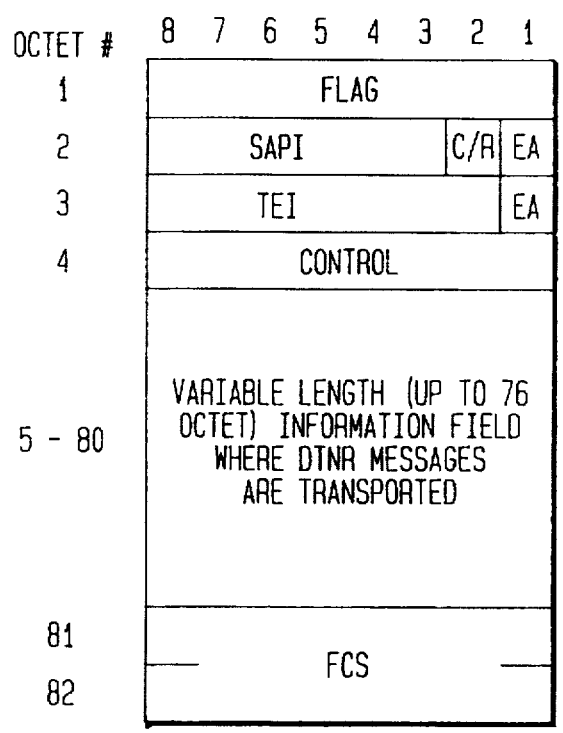
FIG. 14 illustrates a LAP-D frame structure that contains the messages.

In a preferred embodiment, the messages are encapsulated in the Link Access Protocol-D (LAP-D) frame and transported to the adjacent node. FIG. 14 illustrates the LAP-D frame structure. This frame structure is described in the ANSI T1.105.05-1994 standard which is herein incorporated by reference in its entirety.

Generally, the working links carry only the null messages 900 of FIG. 9. Spare/open links, on the other hand, carry each of the messages illustrated in FIGS. 9–13. These messages are carried on a single predefined STS-1 time slot within the OC-12 link. In one embodiment, the messages used in STS-1 signals use the Tandem Connection Overhead (bits 5–8 of Z5) as the field for the signaling structure. Additionally, the messages use the unacknowledged mode of operation. The messages are sent immediately upon state change and then repeated once per second. The first message is acted upon unless it fails its Frame Check Sequence.

a. SONET Null Message Structure

FIG. 9 illustrates an embodiment of a null message 900. Null message 900 comprises a message type field 902, a port type field 904, a transmitting node ID field 906, a DTNR link ID field 908, a link inhibit field 910, a far end not connected field 912, a return alarm field 914, a DTNR rev field 916 and an exerciser return alarm field 918. Each message field 902–918 is described in detail below.

(1) Message Type Field

Message type field 902 is a 4-bit number that identifies the type of message as either a null, flooding, reverse-linking, connect, etc. The defined values for message type field 902 are listed below. As shown, message type field 902 has a value of "0".

0—Null
1—Release message
2—Flooding message
3—Reverse-Linking message
4—Connect message
5—Exerciser Release Message
6—Exerciser Flooding message
7—Exerciser Reverse-linking message
8—Exerciser Connect message
9—Path Verification Circuit ID (PVCID) message (2) Port Type Field Port type field 904 is a number that represents the far-end port type as configured from the user interface. The port type received on a port must match the type transmitted on a port. This will assure that both of the ports are configured the same. The following values are assigned to the various port types:

0—Reserved for future use.
1—DTNR Working OC-12 Port
2—DTNR Spare OC-12 Port
3—DTNR Open OC-12 Port
4—Reserved (future Preemptable Protect Channel Access OC-12 Port)
5—DTNR Access/Egress OC-12 Port
6—Non-Restorable Port (3) Transmitting Node ID Field Transmitting node ID field 906 is an 8-bit field that represents the node which transmitted null message 900. The node ID of zero is reserved for future use. The node ID is configured by Restoration Management at commissioning of the network restoration protocol.

The node ID is transmitted continuously into null messages 900 so that each node can identify all the links in a given span. The second function of this stored transmitting node ID is that when a failure occurs, the network restoration protocol can access the memory and determine which node the lost message is linked to.

Transmitting node ID field 906 is also used for loopback detection. Any node receiving its own ID in this field will raise a loopback alarm to the User Interface/Monitor and Control Workstation.

(4) DTNR Link ID Field

DTNR link ID field 908 is used to identify a working, spare or open link OC-12 port number. For example, when a circuit is cross-connected and provisioned as a working link, the node sends an OC-12 port number on each working null message 900. This number is the local OC-12 port number which is sending null message 900. The receiving node stores this port number and associates it with the port where it was received.

(5) Link Inhibit Field

The transmission or reception of a one in link inhibit field 910 prevents the network restoration protocol from either using or restoring this link. For example, the port states which set this bit are test access, working link not cross-connected (on any STS-1), spare/open unavailable, or manual lockout of a link for maintenance purposes.

(6) Far End Not Connected

The receipt of a one in far end not connected field 912 commands the receiving node to ignore this link for restoration and forward this field upstream if (and only if) all twelve STS-1s in the link are locally crossconnected to a single OC-12 interface. This prevents the restoration of unprovisioned OC-12s and avoids wasting spare capacity. Far end not connected field 912 is necessary to distinguish unequipped paths from other inhibiting states so that it may be forwarded back upstream.

(7) Return Alarm Field

Return alarm field 914 is set to a one and then sent on the transmit side of any port where a loss of signal (LOS), loss of frame (LOF), or STS path AIS condition is detected. This field awakens the adjacent node's network restoration processing in the event of a unidirectional signal failure (i.e., simplex failure). The return alarm must also persist through the timers just as any other failure is required. The same rules for fault isolation apply for the return alarm field (ISF, timers, etc.).

(8) DTNR Revision Field

DTNR Revision field 916 represents the software revision of the DCS at its node. The DCS will disable the network restoration protocol and raise a minor alarm when an incompatible DTNR software revision is received.

(9) Exerciser Return Alarm Field

The single bit in exerciser return alarm field 918 is a one when the MCWS has initiated a manual exerciser that fails this particular link. This serves to awake the other custodial node upon initiation of the manual exerciser.

b. SONET Flooding Message Structure

Figure 10:
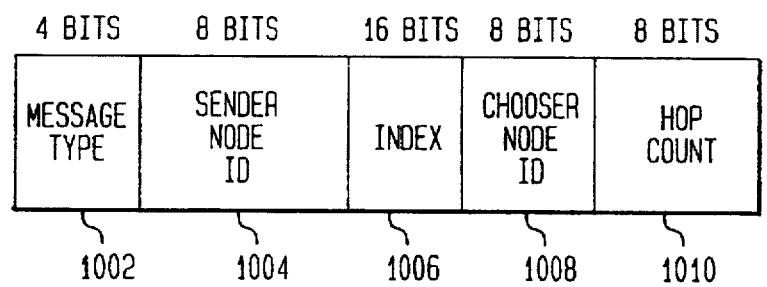

Referring to FIG. 10, flooding message 1000 performs a search of available alt-routes. For each link on a span with a validated alarm, the sender node floods one STS-1 on a single spare link on all logical spans. Tandem nodes multicast flooding messages 1000 as described above. Message type field 1002, sender node ID field 1004, index field 1006, chooser node ID field 1008 and hop count field 1010 are described in detail below.

(1) Message Type Field

Message type field 1002 is described in section 4.a.1 above. The defmed value for a flooding message is "2".

(2) Sender/Chooser Node ID Field

Sender node ID field 1004 and Chooser node ID field 1008 identify the custodial nodes in the restoration action.

(3) Index Field

Index field 1006 is a 16-bit field that contains a unique integer that represents the sender node's OC-12 port number for the spare link on which flooding message 1000 is placed. In combination with the node ID, the number provides a way for the custodial nodes to distinguish among multiple links' flooding messages.

(4) Hop Count Field

Hop count field 1010 is a 8-bit field that contains a configurable value sent out during flooding from the sender node. Each subsequent tandem node decrement this hop count by one.

c. Reverse Linking Message Structure

Figure 11:
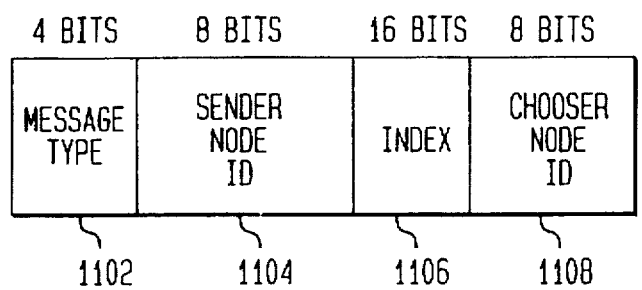
Figure 12:
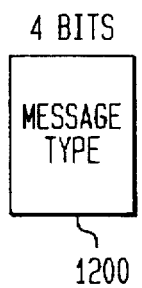
Figure 13:
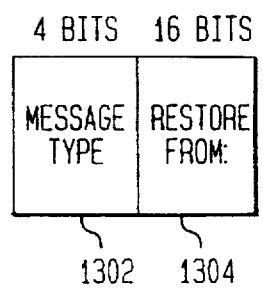

The chooser node responds to flooding message 1000 of a given index with the lowest hop count by transmitting a reverse-linking message 1100 (FIG. 11). This message is read in each tandem node and associated with its complementary flooding message 1000. The tandem node will then make a cross-connect from the port it received reverse-linking message 1100 on to the "precursor" port that it received the initial flooding message 1000 of the same sender/chooser/index. Reverse linking message 1100 also serves to inform the sender node which OC-12 is to be restored into this particular alt-route.

Once reverse-linking message 1100 is received by the sender node, it is stored until the alarm for the failed working link (represented by that index) persists through holdoff timer 704.

(1) Message Type Field

Message type field 1102 is described in section 4.a.1 above. The defined value for a flooding message is "3".

(2) Sender Node ID Field, Index Field and Chooser Node ID Field

Sender node ID field 1104, index field 1106 and chooser node ID field 1108 are identical to their counterparts in flooding message 1000.

d. Release Message Structure

Release messages 1200 (FIG. 12) perform a single, time-critical function of releasing spare links when a shortest path is secured through reverse linking. Release messages 1200 are sent from the sender once an alt-route has 20 been secured for a given index (via reverse linking message 1100 reception). Release messages 1200 are also sent by the sender node once (1) preactivation timer 706 has expired, (2) there are alt-routes being held in reserve due to scavenging, and (3) no other links have detected alarms. In this case, release messages 1200 free up spare capacity for other possible sender nodes Message type field 1202 is described in section 4.a.1 above. The defmed value for a flooding message is "1".

4. Connect Message Structure

Connect message 1300 (FIG. 13) is placed into links by the sender node when a restoration circuit is cross-connected into those links. The role of connect message 1300 is to conunand the chooser node to perform the (reserved) restorative cross-connect. Connect message 1300 is stored and forwarded through tandem nodes regardless of whether its restoration cross-connect is set up yet. In this manner, all nodes begin the process of ordering and executing a restoration cross-connect without waiting for upstream cross-connects to complete.

(1) Message Type Field

Message type field 1302 is described in section 4.a.1 above. The defined value for a flooding message is "4".

(2) Restore From Field

Restore from field 1304 is a 16-bit field populated by the sender node that identifies which failed OC-12 link the sender node cross-connects into this alt-route. The sender node gets this OC-12 port number from its link ID state table.

While the invention has been particularly shown and described with reference to preferred embodiments thereof, it will be understood by those skilled in the relevant art that various changes in form and details may be made therein without departing from the spirit and scope of the invention.

What is claimed is:

1. A method of restoring communication between at least one pair of nodes in a network having a plurality of nodes and a plurality of links interconnecting the nodes, comprising the steps of:

(1) sending null messages between adjacent nodes on working and spare links, wherein said null messages comprise a transmitting node ID field and a link ID field;

(2) receiving, in at least a first node, a signal that indicates an alarm in a link between said first node and a second node;

(3) starting an alarm validation timer and a holdoff timer, wherein said holdoff timer prevents link restoration due to short-duration hits;

(4) inserting by said first node an incoming signal failure (ISF) signal downstream from said link to quiet downstream links in alarm;

(5) validating said alarm if said alarm persists through said alarm validation timer;

(6) identifying a sender node and a chooser node based on an arbitration between said first node and said second node adjacent to said link;

(7) sending by said sender node a flooding message, comprising a sender node ID field, an index field, a chooser node ID field and a hop count field, on one spare link on each logical span between said sender node and any of the plurality of nodes in the network connected to said sender node;

(8) after said alarm is validated, starting by said sender node a preactivation timer;

(9) after said sender node sends said flooding message on at least one logical span, starting a sender time-out timer;

(10) starting by said chooser node a chooser timer for each received flooding message having a unique combination of values in said sender node ID field, said index field and said chooser node ID field;

(11) after said chooser timer has expired for a unique received flooding message, selecting by said chooser node a shortest restoration route and sending a reverse linking message on said shortest restoration route, wherein said reverse linking message comprises a sender node ID field, an index field, and a chooser node ID field;

(12) identifying by said sender node a link restoration route based on a received reverse linking message;

(13) sending by said sender node release messages on all other spare links separate from said link restoration route;

(14) after said holdoff timer expires, sending by said sender node a connect message to said chooser node, wherein said connect message comprises a restore from field that identifies said link to said chooser node for correct cross connection; and

(15) after said preactivation timer expires, releasing by said sender node any reserved and unused restoration routes.

2. The method of claim 1, wherein said steps (1), (4), (7), (11), (13), (14) and (15) comprise the step of encapsulating messages in the Link Access Protocol-D (LAP-D) frame for transport to adjacent nodes.

3. The method of claim 1, wherein said steps (1), (4), (7), (11), (13), (14) and (15) comprise the step of sending messages in a single STS-1 time slot in an OC-N link.

4. The method of claim 1, wherein said step (1) comprises the step of sending null messages that comprise a transmitting node ID field, a link ID field, a message type field, a port type field, a link inhibit field, a far end not connected field, a return alarm field, a software revision field, and a exerciser return alarm field.

5. The method of claim 1, wherein said step (1) comprises the step of sending null messages immediately upon a state change and periodically thereafter.

6. The method of claim 1, further comprising the step of converting said ISF signal back to an alarm indication signal (AIS) at access/egress ports before said ISF signal leaves the network.

7. The method of claim 1, wherein said step (4) comprises the step of starting an alarm validation timer upon receipt of all STS-Path AISs for said link, an OC-N loss of signal (LOS), or loss of frame (LOF).

8. The method of claim 1, wherein said step (6) comprises the following steps that are performed by said first node:

(a) identifying a node ID for said second node based on said transmitting node ID field of said null messages;

(b) assuming a sender role if said node ID for said second node is smaller then said node ID of said first node, otherwise, said first node assuming a chooser role.

9. The method of claim 1, wherein said step (7) comprises the step of sending a flooding message, comprising a message type field, a sender node ID field, an index field, a chooser node ID field and a hop count field, on one spare link on each logical span between said sender node and any of the plurality of nodes in the network.

10. The method of claim 1, further comprising the step of said sender node queuing said flooding message if another sender node has sent flooding messages on all of said sender node's spare links.

11. The method of claim 1, wherein said step (11) comprises the step of sending a reverse linking message that comprises a message type field, a sender node ID field, an index field, and a chooser node ID field.

12. The method of claim 1, wherein said step (11) comprises the steps of:

(a) after said chooser timer has expired, said chooser node selecting said shortest restoration route based on the received flooding message having the lowest value in said hop count field; and (b) sending said reverse linking message out on the port that received the flooding message having the lowest hop count value.

13. The method of claim 1, further comprising the steps of:

(16) receiving one of said flooding messages at a tandem node;

(17) said tandem node multicasting said flooding message into one spare link in all spans except:
  i) the span that received said flooding message,
  ii) spans that have already been flooded with another flooding message having the same index, and
  iii) spans directly connected to said sender node;

(18) decrementing the value in said hop count field by one.

14. The method of claim 13, wherein said step (17) further comprises the step of sending said flooding message into spare links that have not received a flooding message.

15. The method of claim 1, further comprising the steps of:

(16) receiving one of said reverse linking messages on a first port;

(17) associating said received reverse linking message with a complimentary flooding message, wherein a flooding message and a reverse linking message are complimentary if said index field, said sender ID field and said chooser ID field are the same;

(18) forwarding said reverse linking message to a second port that received said complimentary flooding message;

(19) cross connecting said first port and said second port; and

(20) replacing multicasted copies of flooding messages having the same index with release messages.

16. The method of claim 1, further comprising the step of labeling unrestored links as unrestored outstanding alarms if said sender time-out timer expires prior to the receipt of any of said reverse linking messages.

17. The method of claim 1, further comprising the steps of:

(16) starting a drop dead timer in said sender node and said chooser node upon detection of a failure in said link; and

(17) starting a drop dead timer in a tandem node upon first receipt of a flooding message.

18. The method of claim 1, wherein said step (14) comprises the step of including the value of said link ID field in a previously received null message into said restore from field.

19. A method of restoring communication between at least one pair of nodes in a network having a plurality of nodes and a plurality of links interconnecting the nodes, comprising the steps of:

(1) detecting a failed link;

(2) inserting an incoming signal failure (ISF) signal downstream from said failed link to quiet downstream links in alarm;

(3) after an alarm validation timer has expired, sending by a sender node a flooding message, said flooding message comprising a sender node ID field, an index field, a chooser node ID field and a hop count field, on one spare link on each logical span between said sender node and any of the plurality of nodes in the network connected to said sender node;

(4) after a chooser timer has expired, selecting by said chooser node a shortest restoration route and sending a reverse linking message on said shortest restoration route, wherein said reverse linking message comprises a sender node ID field, an index field, and a chooser node ID field;

(5) identifying by said sender node a link restoration route based on a received reverse linking message and sending release messages on all other spare links separate from said link restoration route;

(6) after a holdoff timer expires, sending by said sender node a connect message to said chooser node, wherein said connect message comprises a restore from field that identifies said link to said chooser node for correct cross connection; and (7) after a preactivation timer expires, releasing by said sender node any reserved and unused restoration routes.

* * * * *